United States Patent
Yamasaki et al.

(10) Patent No.: US 9,402,048 B2
(45) Date of Patent: Jul. 26, 2016

(54) IMAGE CONTROL DEVICE, IMAGE CONTROL SYSTEM, AND DIGITAL CAMERA

(75) Inventors: Yusuke Yamasaki, Kawasaki (JP); Noboru Akami, Chigasaki (JP)

(73) Assignee: NIKON CORPORATION, Tokyo (JP)

( * ) Notice: Subject to any disclaimer, the term of this patent is extended or adjusted under 35 U.S.C. 154(b) by 293 days.

(21) Appl. No.: 13/515,615

(22) PCT Filed: Feb. 7, 2011

(86) PCT No.: PCT/JP2011/052530
§ 371 (c)(1),
(2), (4) Date: Jun. 13, 2012

(87) PCT Pub. No.: WO2011/099450
PCT Pub. Date: Aug. 18, 2011

(65) Prior Publication Data
US 2012/0249856 A1    Oct. 4, 2012

(30) Foreign Application Priority Data
Feb. 15, 2010   (JP) ................................. 2010-030065

(51) Int. Cl.
*H04N 5/77* (2006.01)
*H04N 5/232* (2006.01)
*H04N 9/82* (2006.01)

(52) U.S. Cl.
CPC .............. *H04N 5/77* (2013.01); *H04N 5/23293* (2013.01); *H04N 9/8205* (2013.01)

(58) Field of Classification Search
CPC .... H04N 5/23293; H04N 5/2228; H04N 1/00
See application file for complete search history.

(56) References Cited

U.S. PATENT DOCUMENTS

2005/0018057 A1*  1/2005  Bronstein et al. ............. 348/239

FOREIGN PATENT DOCUMENTS

| JP | 2005-064852 A |   | 3/2005 |           |
|----|---------------|---|--------|-----------|
| JP | 2005-064852 A | * | 3/2005 | H04N 5/93 |
| JP | 2008-165009 A |   | 7/2008 |           |

OTHER PUBLICATIONS

Office Action issued in Chinese Patent Application No. 201180005018.5 dated Nov. 24, 2014 (with translation).

* cited by examiner

*Primary Examiner* — Tuan Ho
(74) *Attorney, Agent, or Firm* — Foley & Lardner LLP

(57) ABSTRACT

The invention is provided with: an acquisition unit that acquires, from an external machine, image data as well as time data when an image based on the image data has been displayed on the external machine; a data memory unit that stores, for each unit of the image data, the image data and the time data acquired in the acquisition unit; and a prioritization determination unit that determines, on the basis of the time data, a prioritization of the image data stored in the data memory unit.

17 Claims, 22 Drawing Sheets

FIG.4

FIRST FILE

|  | playback time <camera> ($C_c$) | projection time <projector> ($C_p$) |
|---|---|---|
| image 1 | 10 sec | 8 sec |
| image 2 | 10 sec | 20 sec |
| image 3 | 0 sec | 5 sec |
| image 4 | 0 sec | 30 sec |
| image 5 | 40 sec | 0 sec |
| image 6 | 20 sec | 8 sec |
| . | . | . |
| . | . | . |
| . | . | . |
| image N | . | . |

FIG. 7

| SECOND FILE | |
|---|---|
| | display time <DPF> (Cd) |
| image 1 | 0 sec |
| image 2 | 5 sec |
| image 3 | 10 sec |
| image 4 | 15 sec |
| image 5 | 7 sec |
| image 6 | 6 sec |
| . | . |
| . | . |
| . | . |
| image N | . |

FIG. 9

THIRD FILE

|  | playback time <camera> (Cc) | projection time <projector> (Cp) | display time <DPF> (Cd) | total time (Ca) | ranking (display order) |
|---|---|---|---|---|---|
| image 1 | 10 sec | 8 sec | 0 sec | 18 sec | 5 |
| image 2 | 10 sec | 20 sec | 5 sec | 35 sec | 3 |
| image 3 | 0 sec | 5 sec | 10 sec | 15 sec | 6 |
| image 4 | 0 sec | 31 sec | 15 sec | 46 sec | 2 |
| image 5 | 40 sec | 0 sec | 7 sec | 47 sec | 1 |
| image 6 | 20 sec | 8 sec | 6 sec | 34 sec | 4 |

FIG. 11

FOURTH FILE

|  | display time <DPF> (Cd) | total time (Ca) | ranking (display order) |
|---|---|---|---|
| image 1 | 0 sec | 0 sec | 6 |
| image 2 | 5 sec | 5 sec | 5 |
| image 3 | 10 sec | 10 sec | 2 |
| image 4 | 15 sec | 15 sec | 1 |
| image 5 | 7 sec | 7 sec | 3 |
| image 6 | 6 sec | 6 sec | 4 |

FIG. 13

FIFTH FILE

|  | playback time <camera> (Cc) | projection time <projector> (Cp) | total time (Ca) | ranking (display order) |
|---|---|---|---|---|
| image 1 | 10 sec | — | 10 sec | 3 |
| image 2 | 10 sec | — | 10 sec | 4 |
| image 3 | 0 sec | — | 0 sec | 5 |
| image 4 | 0 sec | — | 0 sec | 6 |
| image 5 | 40 sec | — | 40 sec | 1 |
| image 6 | 20 sec | — | 20 sec | 2 |

FIG. 20

| DISPLAY TIME VALUE | | PREDETERMINED COEFFICIENT VALUE | |
|---|---|---|---|
| Cc | 15 | α | 1.0 |
| Cp | 8 | β | 4.0 |
| Cd | 0 | γ | 1.5 |
| Ct(3D,L) | 0 | δ1 | 2.8 |
| Ct(3D,M) | 0 | δ2 | 2.6 |
| Ct(3D,S) | 0 | δ3 | 2.4 |
| Ct(2D,L) | 15 | δ4 | 2.2 |
| Ct(2D,M) | 0 | δ5 | 2.0 |
| Ct(2D,S) | 0 | δ6 | 1.8 |
| Cpc | 4 | ε | 1.0 |
| Cm | 3 | ζ | 1.0 |

FIG.22 sixth file

| | playback <camera> (Cc) | projection <projector> (Cp) | display <DPF> (Cd) | television display time | | | | | display <PC> (Cps) | display <mobile telephone> (Cm) | edit information (Ce) |
|---|---|---|---|---|---|---|---|---|---|---|---|
| | | | | <3D TV> | | <2D TV> | | | | | |
| | | | | (Ct(3D,L)) | (Ct(3D,M)) | (Ct(3D,S)) | (Ct(2D,L)) | (Ct(2D,M)) | (Ct(2D,S)) | | | |
| image A | 10 sec | 8 sec | 0 sec | 20 sec | 0 sec | 40 sec | 10 sec | 0 sec | 0 sec | 3 sec | 4 sec | 1.0 |
| image B | 10 sec | 20 sec | 5 sec | 5 sec | 0 sec | 5 sec | 0 sec | 0 sec | 50 sec | 2 sec | 5 sec | 1.0 |
| image C | 0 sec | 5 sec | 10 sec | 50 sec | 20 sec | 10 sec | 0 sec | 10 sec | 0 sec | 5 sec | 5 sec | 1.5 |
| image D | 0 sec | 31 sec | 15 sec | 0 sec | 0 sec | 30 sec | 20 sec | 0 sec | 0 sec | 15 sec | 3 sec | 1.0 |
| image E | 40 sec | 0 sec | 7 sec | 0 sec | 0 sec | 50 sec | 30 sec | 0 sec | 60 sec | 4 sec | 2 sec | 1.5 |
| image F | 20 sec | 8 sec | 6 sec | 0 sec | 0 sec | 20 sec | 40 sec | 20 sec | 0 sec | 7 sec | 6 sec | 1.0 |

IMAGE CONTROL DEVICE, IMAGE CONTROL SYSTEM, AND DIGITAL CAMERA

TECHNICAL FIELD

The present invention relates to an image control device, an image control system, and a digital camera.

BACKGROUND ART

An image display device having an imaging unit is known (for example, see Patent Literature 1). According to this image display device, captured images can be prioritized and displayed.

CITATION LIST

Patent Literature

Patent Literature 1: Japanese Unexamined Patent Application Publication No. 2008-165009

SUMMARY OF INVENTION

Technical Problem

However, the aforementioned image display device is problematic in that when the prioritization of the displayed images is determined, no consideration at all is given to the times when the images have been played back in another device.

An object of the present invention is to provide an image control device, an image control system, and a digital camera, capable of determining the prioritization of image data on the basis of the times when the images have been played back in another device.

Solution to Problem

An image control device of the present invention is characterized by comprising: an acquisition unit that acquires, from an external machine, image data as well as time data on when an image based on the image data has been displayed in the external machine; a data memory unit that stores, for each unit of image data, the image data and the time data acquired in the acquisition unit; and a prioritization determination unit that determines, on the basis of the time data, a prioritization of the image data stored in the data memory unit.

An image control system of the present invention is an image display system comprising a digital camera and an image display device, wherein the digital camera is characterized by comprising: an image memory unit that stores image data; an image playback unit that plays back an image based on the image data; a time measurement unit that measures a time when the image based on the image data has been played back in the image playback unit; and a time control unit that stores, for each unit of image data, time data relating to the time; and in that the image control device comprises: an acquisition unit that acquires, from the digital camera, the image data and the time data; a data memory unit that stores, for each unit of image data, the image data and the time data acquired in the acquisition unit; and a prioritization determination unit that determines, on the basis of the time data, a prioritization of the image data stored in the data memory unit.

An image control system of the present invention is an image control system comprising an image display device and a digital camera, wherein the image display device is characterized by comprising: an image memory unit that stores image data; an image display unit that displays an image based on the image data; a display time measurement unit that measures a display time when the image based on the image data has been displayed in the image display unit; and a time control unit that stores, for each unit of image data, display time data relating to the display time; and in that the digital camera comprises an acquisition unit that acquires, from the image display device, the image data and the display time data; a data memory unit that stores, for each unit of image data, the image data and the display time data acquired in the acquisition unit; and a prioritization determination unit that determines, on the basis of the display time data, a prioritization of the image data stored in the data memory unit.

A digital camera of the present invention is characterized by comprising: an acquisition unit that acquires, from an external machine, image data as well as time data on when an image based on the image data has been displayed in the external machine; a data memory unit that stores, for each unit of image data, the image data and the time data acquired in the acquisition unit; a prioritization determination unit that determines, on the basis of the time data, a prioritization of the image data stored in the data memory unit; an image playback unit that plays back the image based on the image data; and a playback control unit that controls the image playback unit to play back the image based on the image data on the basis of the prioritization determined by the prioritization determination unit.

A digital camera of the present invention is characterized by comprising: an image memory unit that stores image data; a display unit that plays back an image based on the image data; a projection unit that projects the image based on the image data; a playback time measurement unit that measures a playback time when the image based on the image data has been played back by the display unit; a projection time measurement unit that measures a projection time when the image based on the image data has been projected by the projection unit; a playback time memory unit that stores, for each unit of image data, playback time data relating to the playback time; a projection time memory unit that stores, for each unit of image data, projection time data relating to the projection time; a first prioritization determination unit that determines, on the basis of the playback time data stored in the playback time memory unit, a prioritization of the image data stored in the image memory unit; a second prioritization determination unit that determines, on the basis of the projection time data stored the projection time memory unit, a prioritization of the image data stored in the image memory unit; a display control unit that controls the display unit to display the image based on the image data stored in the image memory unit on the basis of the prioritization determined by the second prioritization determination unit; and a projection control unit that controls the projection unit to project the image based on the image data stored in the image memory unit on the basis of the prioritization determined by the first prioritization determination unit.

Advantageous Effects of Invention

According to the present invention, is possible to determine a prioritization of image data, on the basis of the time when images have been played back in another device.

BRIEF DESCRIPTION OF DRAWINGS

FIG. 4 is a drawing illustrating a file of the digital camera in the image display system according to the first embodiment.

FIG. 7 is a drawing illustrating the file of the digital camera in the image display system according to the first embodiment.

FIG. 9 is a drawing illustrating a file of the digital photo frame in the image display system according to the first embodiment;

FIG. 11 is a drawing illustrating a file of the digital camera according to the second embodiment.

FIG. 13 is a drawing illustrating a file of the digital camera according to the third embodiment.

FIG. 20 is a drawing illustrating a display time and a predetermined coefficient value in the image display system according to the fourth embodiment.

FIG. 22 is a drawing illustrating a file of a digital camera in an image display system according to an embodiment.

DESCRIPTION OF EMBODIMENTS

Figure 1:
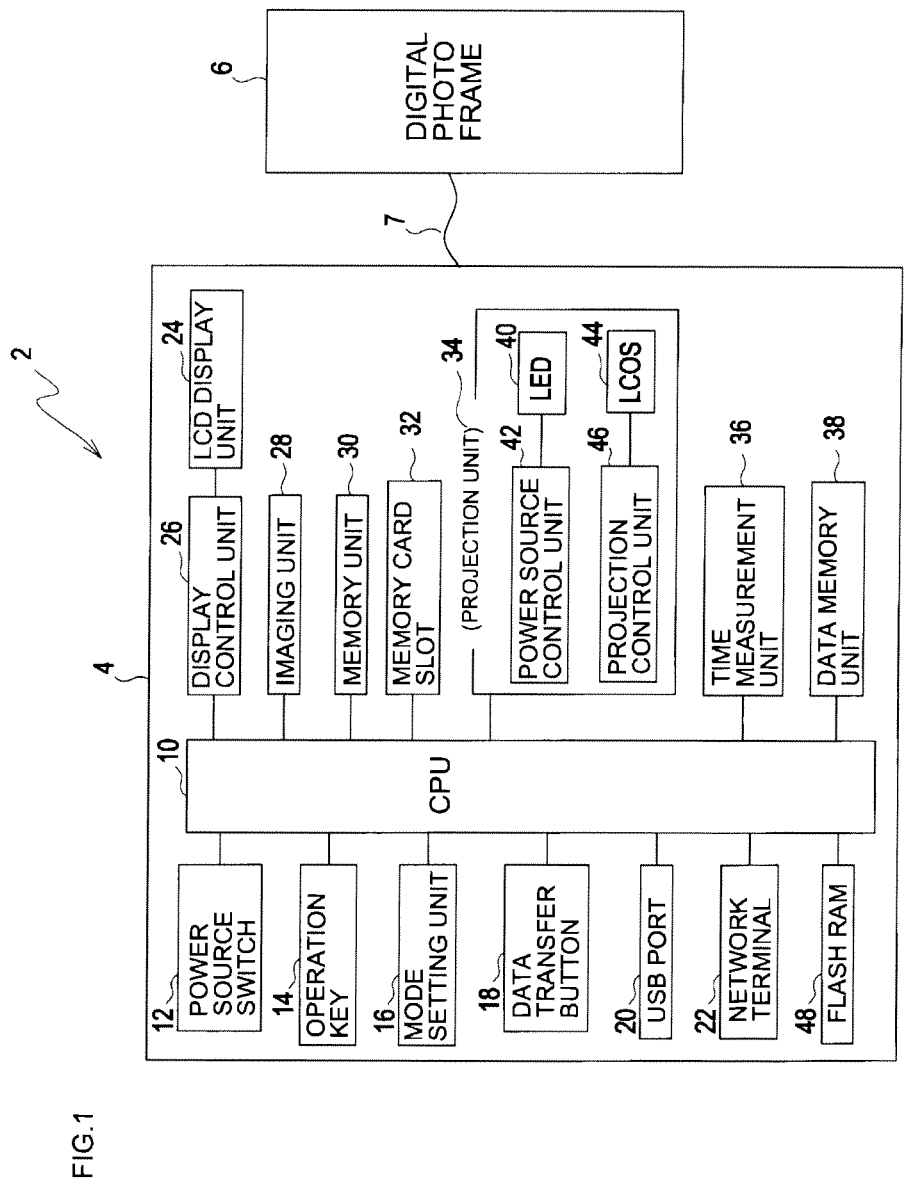
FIG. 1 is a block diagram illustrating a system configuration of a digital camera in an image display system according to a first embodiment.

What follows is a description of an image display system according to a first embodiment, with reference to the accompanying drawings. FIG. 1 is a block diagram illustrating a system configuration of a digital camera 4 in an image display system 2 according to the first embodiment. The image display system 2 is provided with the digital camera 4 as well as with a digital photo frame (hereinafter, "DPF") 6, and is connected via a USB cable 7. The digital camera 4 is provided with a CPU 10, and the CPU 10 is provided with: a power source switch 12 for switching between an on and off state of a power source of the digital camera 4; an operation key 14 used during a function setting of the digital camera 4 and during a display setting of an image; a mode setting unit 16 for setting an image playback mode for causing a display unit of the digital camera 4 to play back and display an image, an image projection mode for projecting an image, and a ranking mode for determining a prioritization of image data and for playing back and displaying, on the basis of the prioritization, an image based on the image data; a data transfer button 18 for commanding a transfer of data from the digital camera 4 to the DPF 6; a USB port 20 at which a USB machine is connected; and a network terminal 22 at which an Ethernet (trademark) standard or other network cable is connected.

The CPU 10 is connected to: a display control unit 26 for controlling the display of an LCD display unit 24; an imaging unit 28 having an imaging element constituted of a CCD or the like for imaging a subject; a memory unit 30 for storing image data generated by an A/D conversion, in an A/D conversion unit (not shown), of an imaging signal outputted from the imaging unit 28, and the like; a memory card slot 32 for inserting and removing a memory card for storing image data relating to an image captured in the imaging unit 28, and the like; a projection unit 34 for projecting an image based on the image data; a time measurement unit 36 for counting a playback time (Cc) relating to the image played back and displayed in the LCD display unit 24 as well as a projection time (Cp) relating to the image projected by the projection unit 34; and a data memory unit 38 for storing, for each file of the image data, the playback time (Cc) and the projection time (Cp) counted in the time measurement unit 36. Herein, the projection unit 34 is provided with: a power source control unit 42 for turning on and off an LED 40, which is a light source, and for adjusting the light intensity of projection light emitted from the LED 40; and a projection control unit 46 for controlling an LCOS 44 for displaying a projected image. The CPU 10 is connected to a flash RAM 48, and the flash RAM 48 stores a program for controlling the entirety of the camera according to the embodiment as well as a program for executing processing illustrated in the flow charts described below.

Figure 2:
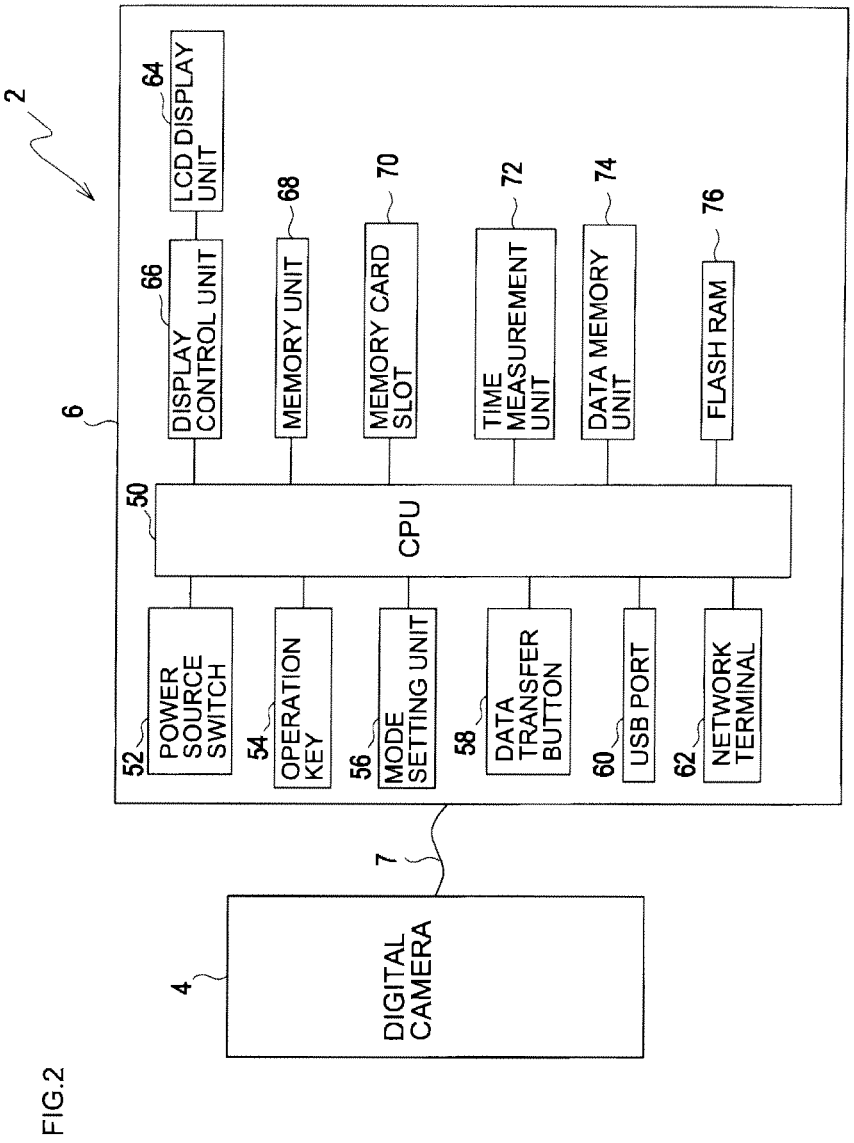
FIG. 2 is a block diagram illustrating a system configuration of a digital photo frame in the image display system according to the first embodiment.

FIG. 2 is a block diagram for illustrating the system configuration of the DPF 6 in the image display system 2 according to the first embodiment. The DPF 6 is provided with a CPU 50, and the CPU 50 is provided with: a power source switch 52 for switching between an on and off state of a power source of the DPF 6; an operation key 54 used during a function setting of the DPF 6 and during a display setting of an image; a mode setting unit 56 for setting an image display mode for displaying an image, and a ranking mode for determining a prioritization of image data and for displaying an image on the basis of the prioritization; a data transfer button 58 for commanding a transfer of data from the DPF 6 to the digital camera 4; a USE port 60 at which a USE machine is connected; and a network terminal 62 at which an Ethernet (trademark) standard or other network cable is connected. The CPU 50 is connected to: a display control unit 66 for controlling the display of an LCD display unit 64; a memory unit 68 for storing image data relating to the image displayed on the LCD display unit 64; a memory card slot 70 for inserting and removing a memory card for storing the image data; a time measurement unit 72 for counting a display time (Cd) relating to the image displayed on the LCD display unit 64;

and a data memory unit 74 for storing, for each file of the image data, the display time (Cd) counted in the time measurement unit 72. The CPU 50 is connected to a flash RAM 76, and the flash RAM 76 stores a program for controlling the entirety of the DPF according to the embodiment as well as a program for executing processing illustrated in the flow charts described below.

Figure 3:
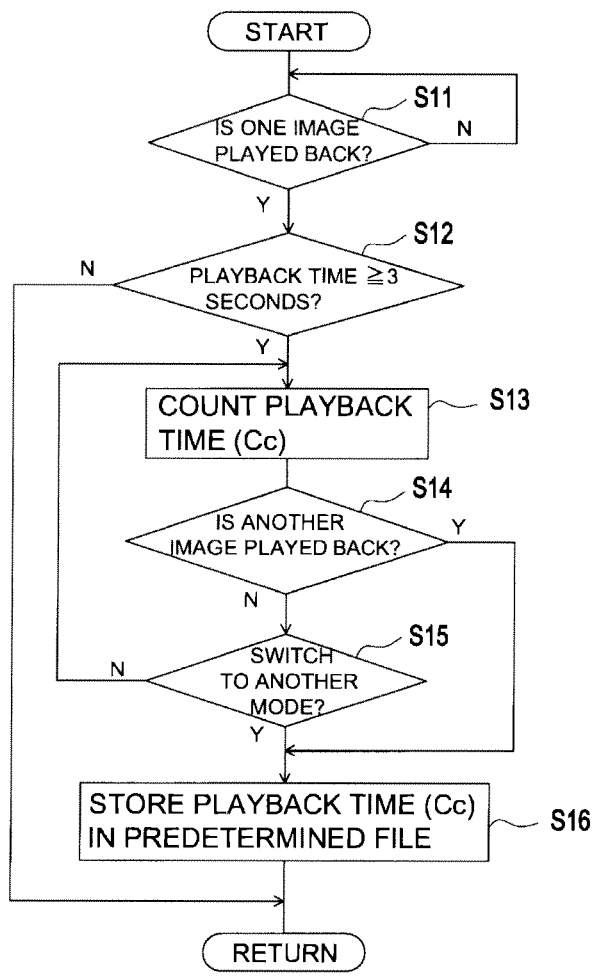
FIG. 3 is a flow chart illustrating image playback processing of the digital camera in the image display system according to the first embodiment.

Next, a description of image playback processing of the digital camera 4 in the image display system 2 according to the first embodiment shall now be provided, with reference to the flow chart illustrated in FIG. 3. Firstly, when the mode setting unit 16 is operated and the image playback mode is thereby set, the CPU 10 reads image data selected by an operator from the memory card inserted into the memory card slot 32, and causes, via the display control unit 26, the LCD display unit 24 to play back and display an image based on the image data (step S11). In a case where the image has been played back and displayed, a determination is made as to whether or not the time when the image has been played back and displayed has passed a predetermined duration of time (step S12). The predetermined duration of time serving as the criterion in step S12 can be set by the operator as desired, such as, for example, to 3 seconds. In a case where the time when the image has been played back and displayed has passed the predetermined duration of time (step S12: Y), counting of the playback time (Cc) of the image is begun in the time measurement unit 36 (step S13). For example, in a case where the time when an "image 1" has been played back and displayed passes 3 seconds, then the CPU 10 begins counting the playback time (Cc) of the "image 1". On the other hand, no counting is performed in a case where the time when the image has been played back and displayed does not pass 3 seconds (step S12: N).

Next, the CPU 10 determines whether or not another image has been played back and displayed on the LCD display unit 24 (step S14). In a case where, for example, the operation key 14 has been used to perform an image frame advance or other operation, then the CPU 10 determines that another image has been played back and displayed. In a case where no other image has been played back and displayed (step S14: N), then the CPU 10 determines whether or not a switch has been made from the image playback mode to another mode (step S15). In a case where, for example, the mode setting unit 16 has been operated and the projection mode has been set, then a determination is made that a switch has been made to another mode. In a case where another image has been played back and displayed (step S14: Y), and in a case where a switch has been made to another mode (step S15: Y), the CPU 10 causes the playback time (Cc) to be stored in a predetermined file (hereinafter, "the first file") stored in the data memory unit 38 for each file of the image data (step S16). For example, the playback time (Cc) is stored as 10 seconds for the "image 1". In a case where the playback times (Cc) have been counted from the "image 1" until an "image N", then the playback times (Cc) are stored in the first file as illustrated in FIG. 4. Specifically, the playback time (Cc) is stored as 10 seconds for the "image 1", which is the first image to be played back and displayed, and the playback time (Cc) is stored as 10 seconds for an "image 2," which is the other image; then, an "image 3" and an "image 4" played back and displayed thereafter are played back and displayed for a time less than 3 seconds, and the playback time (Cc) thereof is therefore stored as 0 seconds. The playback time (Cc) is stored as 40 seconds for an "image 5", as 20 seconds for an "image 6", and so on until the "image N" for each file of the image data relating to the images that have been played back and displayed. On the other hand, in a case where no switch has been made to another mode (step S15: N), the counting of the playback time (Cc) of the image is continued (step S13). After the termination of the image playback mode, the CPU 10 stores the first file, which is stored in the data memory unit 38, in the memory card inserted into the memory card slot 32.

Figure 5:
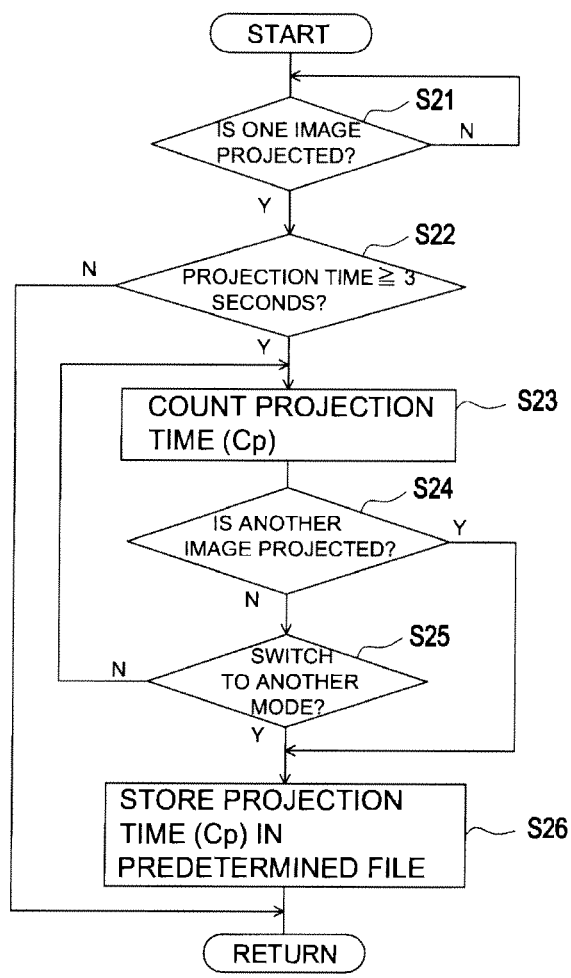
FIG. 5 is a flow chart illustrating image projection processing of a projector in the image display system according to the first embodiment.

Next, a description of image projection processing by the projection unit 34 of the digital camera 4 in the image display system 2 according to the first embodiment shall now be provided, with reference to the flow chart illustrated in FIG. 5. Firstly, when the mode setting unit 16 is operated and the image projection mode for projecting images is set, then the CPU 10 commands the projection unit 34 to begin projecting, and the power source control unit 42 turns on the LED 40. The projection control unit 46 reads out image data relating to the projected image from the memory card inserted into the memory card slot 32, and displays the image on the LCOS 44, thus performing image projection (step S21). In a case where image projection has been performed, the CPU 10 determines whether or not the projection time of the image has passed a predetermined duration of time (step S22). The predetermined duration of time serving as the criterion in step S22 can be set by the operator as desired, such as, for example, to 3 seconds. In a case where the time when the image has been projected has passed the predetermined duration of time (step S22: Y), counting of the projection time (Cp) of the image is begun in the time measurement unit 36 (step S23). For example, in a case where the time when "the image 1" has been projected passes 3 seconds, then the CPU 10 begins counting the projection time (Cp) of the "image 1". On the other hand, no counting is performed in a case where the time when the image has been projected does not pass 3 seconds (step S22: N).

Next, the CPU 10 determines whether or not another image has been projected (step S24). In a case where, for example, the operation key 14 has been used to perform a frame advance or other operation of the image being projected, then a determination is made that another image has been projected. In a case where no other image has been projected (step S24: N), then the CPU 10 determines whether or not a switch has been made from the image projection mode to another mode (step S25). In a case where, for example, the mode setting unit 16 has been operated and the image playback mode has been set, then a determination is made that a switch has been made to another mode. In a case where another image has been projected (step S24: Y), and in a case where a switch has been made to another mode (step S25: Y), the CPU 10 causes the projection time (Cp) to be stored in the first file stored in the data memory unit 38 for each file of the image data (step S26). For example, the projection time (Cp) is stored as 8 seconds for the "image 1". In a case where the projection times (Cp) have been counted from the "image 1" until the "image N", then the projection times (Cp) are stored in the first file as illustrated in FIG. 4. That is, the projection time (Cp) is stored as 8 seconds for the "image 1", which is the first image to be projected, and the projection time (Cp) is stored as 20 seconds for the "image 2," which is the other image; then, the projection time (Cp) is stored as 5 seconds and as 30 seconds for the "image 3" and the "image 4", respectively, having been projected thereafter. The "image 5" is projected for a time less than 3 seconds, and the projection time (Cp) thereof is therefore stored as 0 seconds. The projection time (Cp) is stored as 8 seconds for the "image 6", as 20 seconds for an "image 6", and so on until the "image N" for each file of the image data relating to the images that have been projected. On the other hand, in a case where no switch has been made to another mode (step S25: N), the counting of the projection time (Cp) of the image is continued (step S23).

After the termination of the image projection mode, the CPU 10 stores the first file, which is stored in the data memory unit 38, in the memory card inserted into the memory card slot 32.

Next, a description of data transfer processing, from the digital camera 4 to the DPF 6, in the image display system 2 according to the first embodiment shall now be provided. Firstly, when the data transfer button 18 is operated by the operator, the CPU 10 of the digital camera 4 reads out the first file and the image data stored in the memory card inserted into the memory card slot 32, and transmits the same to the DPF 6 from the USB port 20 via the USB cable 7. The DPF 6 receives the first file and the image data via the USB port 60, and a command from the CPU 50 causes the first file and the image data to be stored in the memory card inserted into the memory card slot 70.

Figure 6:
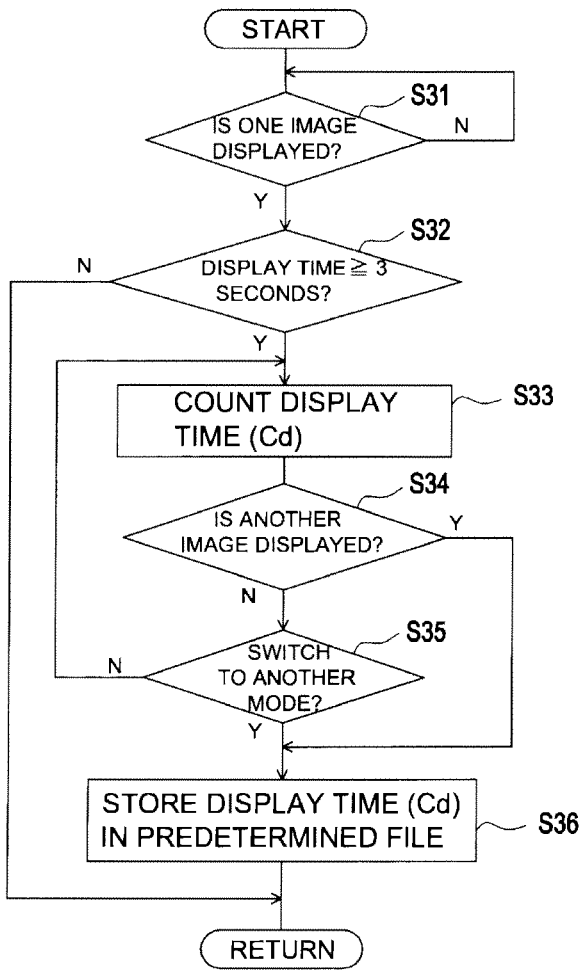
FIG. 6 is a flow chart illustrating image display processing of the digital photo frame in the image display system according to the first embodiment.

Next, a description of image display processing of the DPF 6 in the image display system 2 according to the first embodiment shall now be provided, with reference to the flow chart illustrated in FIG. 6. Firstly, when the mode setting unit 56 is operated and the image display mode is set, then the CPU 50 reads out, from the memory card inserted into the memory card slot 70, image data selected by the operator, and causes, via the display control unit 66, the LCD display unit 64 to display an image based on the image data (step S31). In a case where the image has been displayed, the CPU 50 determines whether or not the display time of the image has passed a predetermined duration of time (step S32). The predetermined duration of time serving as the criterion in step S32 can be set by the operator as desired, such as, for example, to 3 seconds. In a case where the display time of the image has passed the predetermined duration of time (step S32: Y), the CPU 50 begins counting the display time (Cd) of the image in the time measurement unit 72 (step S33). In a case where, for example, the time where the "image 1" has been displayed passes 3 seconds, then the counting of the display time (Cd) of the "image 1" is begun. On the other hand, no counting is performed in a case where the time when the image has been displayed does not pass 3 seconds (step S32: M.

Next, the CPU 50 determines whether or not another image has been displayed on the LCD display unit 64 (step S34). In a case where, for example, the operation key 54 has been used to perform an image frame advance or other operation, then a determination is made that another image has been displayed. In a case where no other image has been displayed (step S34: N), then the CPU 50 determines whether or not a switch has been made from the image display mode to another mode (step S35). In a case where, for example, the mode setting unit 56 has been operated and the ranking mode has been set, then a determination is made that a switch has been made to another mode. In a case where another image has been displayed (step S34: Y) and in a case where a switch has been made to another mode (step S35: Y), then the CPU 50 causes the display time (Cd) to be stored in a predetermined file (hereinafter, the "second file") stored in the data memory unit 74 for each file of the image data (step S36). For example, the time where the "image 1" has been displayed is less than 3 seconds, and therefore the display time (Cd) is stored as 0 seconds. In a case where counting of the display times (Cd) has been performed from the "image 1" to the "image N", then the display times (Cd) are stored in the second file as illustrated in FIG. 7. Specifically, the "image 1", which is the first image to be displayed, is displayed for a time less than 3 seconds, and therefore the display time (Cd) is stored as 0 seconds; the display time (Cd) is stored as 5 seconds for the "image 2", which is the other image, then, the display time (Cd) is stored as 10 seconds, 15 seconds, 7 seconds, and 6 seconds for the "image 3", the "image 4", the "image 5", and the "image 6", respectively, having been played back and displayed thereafter, and so on until the "image N" for each file of the image data relating to the images that have been displayed. On the other hand, in a case where no switch has been made to another mode (step S35: N), the counting of the display time (Cd) of the image is continued (step S33). After the termination of the image display mode, a command from the CPU 50 causes the second file stored in the data memory unit 38 to be stored in the memory card inserted into the memory card slot 70.

Figure 8:
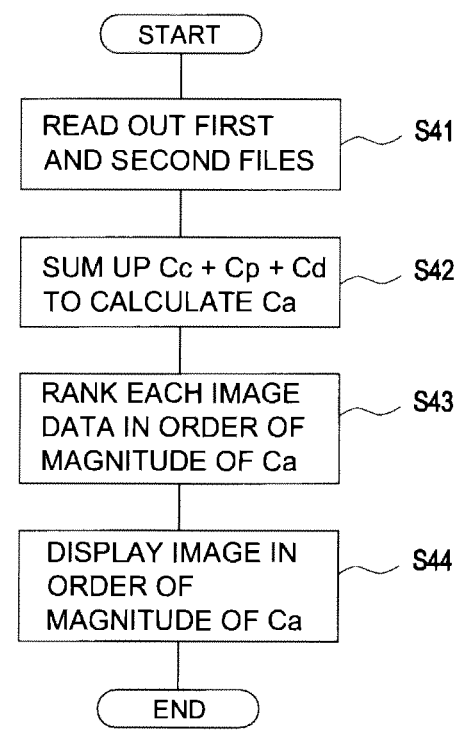
FIG. 8 is a flow chart illustrating prioritization determination processing of the digital photo frame in the image display system according to the first embodiment.

Next, a description of prioritization determination processing in the image display system 2 according to the first embodiment shall now be provided, with reference to FIG. 8. FIG. 8 is a flow chart illustrating the prioritization determination processing of the DPF 6. Firstly, when the mode setting unit 56 is operated and the ranking mode is thereby set, the CPU 50 reads out the first file and the second file from the memory card inserted into the memory card slot 70 (step S41), and combines the first file and the second file to thereby generate a new file (hereinafter, the "third file") for determining the prioritization of the image data (see FIG. 9). Next, for each unit of image data stored in the third file, the CPU 50 calculates a total time (Ca), which is the sum of the playback time (Cc), the projection time (Cp), and the display time (Cd), and causes the calculated time to be stored as the total time (Ca) (step S42). For example, the "image 1" has a total time (Ca) of 18 seconds, because 18 seconds is the sum of the playback time (Cc) of 10 seconds, the projection time (Cp) of 8 seconds, and the display time (Cd) of 0 seconds. Next, the CPU 50 determines the prioritization of the image data in order of magnitude of the total time (Ca), and causes the order to be stored (step S43). For example, in FIG. 9, the prioritization of the image data is, in order, the "image 5", the "image 4", the "image 2", the "image 6", the "image 1", and the "image 3", because the total time (Ca) of the "image 1" is 18 seconds, the total time (Ca) of the "image 2" is 35 seconds, the total time (Ca) of the "image 3" is 15 seconds, the total time (Ca) of the "image 4" is 45 seconds, the total time (Ca) of the "image 5" is 47 seconds, and the total time (Ca) of the "image 6" is 34 seconds. Next, a command from the CPU 50 causes the image data to be sequentially read out, on the basis of the prioritization, from the memory card inserted into the memory card slot 70, in order beginning with the earliest number of prioritization, and the display control unit 66 causes the LCD display unit 64 to sequentially display images based on the read-out image data (step S44). The display images are switched over, for example, at 10-second intervals, and the images are displayed in order beginning with the earliest number of prioritization.

In the prioritization determination processing of the image display system 2 according to the first embodiment, the display time (Cd) is counted and the calculation of the total time (Ca), including the display time (Cd), is performed in the DPF 6, but the counting of the display time (Cd) in the DPF 6 need not be performed. In such a case, after the data transfer processing, only the playback time (Cc) and the projection time (Cp) in the digital camera 4 are summed up to calculate, in the DPF 6, the total time (Ca) (step S42). Next, the CPU 50 determines the prioritization of the image data (step S43), and a command from the CPU 50 causes the image data to be sequentially read out, on the basis of the prioritization, from the memory card inserted into the memory card slot 70, in order beginning with the earliest number of prioritization, and the LCD display unit 64 sequentially displays images based on the read-out image data (step S44). The display images are switched over, for example, at 10-second intervals, and the images are displayed in order beginning with the earliest number of prioritization.

According to the image display system 2 based on the first embodiment, the time when the images have been played back can be counted in the digital camera 4, and the prioritization of the image data can be determined in the DPF 6 on the basis of the time counted in the digital camera 4.

What follows is a description of an image display system according to a second embodiment, with reference to the accompanying drawings. The image display system according to the second embodiment is configured such that the determination of the prioritization, then performed in the DPF 6 in the image display system 2 according to the first embodiment is instead performed in the digital camera 4. Consequently, a detailed description of constituent elements identical to those of the first embodiment has been omitted, and only points of difference are described in detail. Further, the description is provided using the same reference numerals for the same parts of the configuration as in the first embodiment.

Firstly, in the DPF 6, the CPU 50 counts the display time (Cd), stores the display time (Cd) in the second file of the data memory unit 74 for each file of the image data, and causes the second file to be stored in the memory card inserted into the memory card slot 70 (see FIG. 7). Next, the CPU 50 of the DPF 6 reads out the second file and the image data stored in the memory card inserted into the memory card slot 70, and transmits the same from the USB port 60 to the digital camera 4 via the USB cable 7. The digital camera 4 receives the image data and the second file via the USB port 20, and the CPU 10 causes the image data and the second file to be stored in the memory card inserted into the memory card slot 32.

Figure 10:
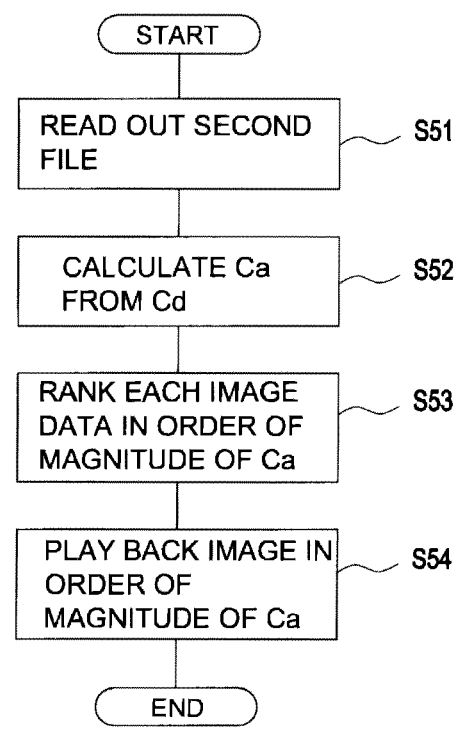
FIG. 10 is a flow chart illustrating prioritization determination processing of a digital camera in an image display system according to a second embodiment.

Next, the prioritization determination processing illustrated by the flow chart of FIG. 10 is performed in the digital camera 4. Specifically, when the ranking mode is set by the operator, the CPU 10 reads out the second file from the memory card inserted into the memory card slot 32 (step S51), and generates, from the second file, a new file (hereinafter, the "fourth file") for determining the prioritization of the image data (see FIG. 11). Next, from the display time (Cd), the CPU 10 calculates, the total time (Ca) for each unit of image data stored in the fourth file, and stores the calculated times in a column for the total times (Ca) (step S52). For example, the total time (Ca) for the "image 1" is 0 seconds, because the display time (Cd) is 0 seconds, and the total time (Ca) for the "image 2" is 5 seconds, because the display time (Cd) is 5 seconds; the total time (Ca) is 10 seconds for the "image 3", 15 seconds for the "image 4", 7 seconds for the "image 5", and 6 seconds for the "image 6". Next, the CPU 10 determines the prioritization of the image data in order of magnitude of total time (Ca), and stores the order in a column for ranking (step S53). The prioritization of the image data is, for example, the "image 4", the "image 3", the "image 5", the "image 6", the "image 2", and the "image 1", in this order.

Next, a command from the CPU 10 causes the image data to be sequentially read out, on the basis of the prioritization, from the memory card inserted into the memory card slot 32 in order beginning from the earliest number of prioritization, and the display control unit 26 causes the LCD display unit 24 to sequentially play back and display images based on the read-out image data (step S54). The display images are switched over, for example, at 10-second intervals, and the images are displayed in order beginning with the earliest number of prioritization.

According to the image display system based on the second embodiment, the time when the images have been displayed can be counted in the DPF 6, and the prioritization of the image data can be determined in the digital camera 4 on the basis of the time counted in the DPF 6.

The image data for which a prioritization has been determined may also be projected by the projection unit 34. In such a case, after the prioritization has been determined, the CPU 10 commands the projection unit 34 to begin projecting, and the power source control unit 42 turns on the LED 40. The projection control unit 46 reads out from the memory card inserted into the memory card slot 32, and displays on the LCOS 44, image data relating to the projected image, on the basis of the prioritization of the image data, thus performing image projection (step S54).

The total time (Ca) may also be calculated inclusive of either one or both of the playback time (Cc) and projection time (Cp) in the digital camera 4. For example, in the DPF 6, a command from the CPU 50 causes the display time (Cd) to be counted and stored in the second file, the second file then being transmitted to the digital camera 4 via the USB cable 7. The second file is stored in the memory card inserted into the memory card slot 32. Next, in the digital camera 4, the CPU 10 counts the playback time (Cc) and the projection time (Cp), stores the same in the first file, and stores the first file in the memory card inserted into the memory card slot 32. Next, the prioritization determination processing is performed. Specifically, the CPU 10 reads out the first file and the second file from the memory card inserted into the memory card slot 32, and combines the first file and the second file, the CPU 10 thereby generating the third file (see FIG. 9). Next, for each unit of image data stored in the third file, the total time (Ca), being the sum of the playback time (Cc), the projection time (Cp), and the display time (Cd)), is calculated, and the prioritization of the image data is determined; the image data is sequentially read out from the memory card inserted into the memory card slot 32 on the basis of the prioritization in order beginning with the earliest number of prioritization, and images based on the read-out image data are displayed sequentially on the LCD display unit 64. The display images are switched over, for example, at 10-second intervals, and the images are displayed in order beginning with the earliest number of prioritization. In such a case, the image data for which the prioritization has been determined may also be projected by the projection unit 34.

What follows is a description of the digital camera 4 according to a third embodiment, with reference to the accompanying drawings. The image display system according to the third embodiment is configured such that processing performed in series in the image display system 2 according to the first embodiment is instead performed within the digital camera 4. Consequently, a detailed description of constituent elements identical to those of the first embodiment has been omitted, and only points of difference are described in detail. Further, the description is provided using the same reference numerals for the same parts of the configuration as in the first embodiment.

Figure 12:
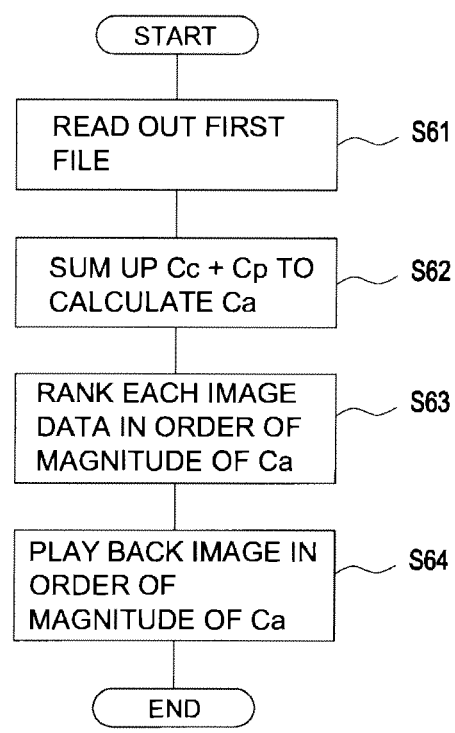
FIG. 12 is a flow chart illustrating prioritization determination processing of a digital camera according to a third embodiment.

Firstly, the playback time (Cc) is counted, and the playback time (Cc) is stored in the first file of the data memory unit 38 for each file of the image data. Next, the prioritization determination processing illustrated by the flow chart in FIG. 12 is performed. Specifically, when the ranking mode is set by the operator, the CPU 10 reads out the first file from the data memory unit 38 (step S61), and generates a new file (hereinafter, the "fifth file") for determining the prioritization of the image data (see FIG. 13). Next, the CPU 10 calculates, from the playback time (Cc), the total time (Ca) for each unit of image data stored in the fifth file, and stores the calculated times in the column for total times (Ca) (step S62). For example, the total time (Ca) for the "image 1" is 10 seconds, because the playback time (Cc) is 10 seconds, and the total time (Ca) for the "image 2" is 10 seconds, because the playback time (Cc) is 10 seconds; the total time (Ca) is 0 seconds for the "image 3", 0 seconds for the "image 4", 40 seconds for the "image 5", and 20 seconds for the "image 6". Herein, in a case where the total times (Ca) are identical, the image data assigned the smaller number is given priority.

Next, the CPU 10 determines the prioritization of the image data in order of magnitude of the total time (Ca), and causes the order to be stored (step S63). For example, the prioritization of the image data is the "image 5", the "image 4", the "image 2", the "image 6", the "image 1", and the "image 3", in this order. Next, a command from the CPU 10 causes the projection control unit 46 to sequentially read out from the data memory unit 38, and display on the LCOS 44, image data relating to the image projected by the projection unit 34, on the basis of the prioritization of the image data and in order beginning with the earliest number of prioritization, thus sequentially performing image projection (step S64). The projected images are switched over, for example, at 10-second intervals, and the images are displayed in order beginning with the earliest number of prioritization.

According to the digital camera based on the third embodiment, the time when the image is played back and displayed in the LCD display unit 24 can be counted, and the prioritization of image data relating to the image projected by the projection unit 34 can be determined on the basis of the time counted.

The CPU 10 may also count the projection time (Cp), calculate the total time (Ca) from the projection time (Cp) (step S62), and determine the prioritization of the image data in order of magnitude of the total time (Ca) (step S63). In such a case, the display control unit 26 causes the LCD display unit 24 to sequentially play back and display the images based on the image data on the basis of the prioritization determined on the basis of the projection time (Cp) (step S64).

The total time (Ca) may also be calculated from both the playback time (Cc) and the projection time (Cp). For example, the CPU 10 may count each of the playback time (Cc) and the projection time (Cp) respectively, calculate the total time (Ca), being the sum of the playback time (Cc) and the projection time (Cp), determine the prioritization of the image data in order of magnitude of the total time (Ca), and cause images based on the image data to be sequentially displayed on the LCD display unit 64 or projected by the projection unit 34 sequentially on the basis of the prioritization.

In the embodiments above, the calculation of the total time (Ca) involves the summing up of the playback time (Cc), the projection time (Cp), and the display time (Cd) without alteration, but the calculation may also be performed once a weighting has been assigned. For example, either the CPU 10 or the CPU 50 may calculate a total value by multiplying $\alpha$, $\beta$, $\gamma$, or other predetermined coefficients, such that the playback time (Cc)×$\alpha$, the projection time (Cp)×$\beta$, and the display time (Cd)×$\gamma$, and the display order or projection order may be determined on the basis of the calculated total value. This makes it possible to determine the prioritization of the image data once consideration has been given to the importance of each of the times. For example, in a case where it is determined that an image displayed on the LCD display unit 24 of the digital camera 4 is an image meant to be recognized by the person who captured the image and is therefore of low importance; where an image projected by the projection unit 34 is an image meant to be seen by a plurality of people and is therefore of high importance; and where an image displayed on the LCD display unit 64 of the DPF 6 is an image meant to be viewed and is therefore deemed not to be as importance as the image projected by the projection unit 34, then the coefficients can be set such that $\alpha<\gamma<\beta$, whereby the image projected by the projection unit 34 can be set to have a high priority and the image displayed on the LCD display unit 24 of the digital camera 4 can be set to have a low priority.

A file created in the DPF may be used during display on the camera, and a file created in the camera may be used in the DPF. Specifically, the CPU 50 may refer to the prioritization determined by the CPU 10, and the CPU 10 may refer to the prioritization determined by the CPU 50.

In the embodiments above, communication between the digital camera 4 and the DPF 6 is performed via the USB cable 7, but data may also be acquired directly from the memory cards by the insertion and removal of the memory cards into/from the memory card slots 32 and 70. For example, in the image display system according to the first embodiment, the playback time (Cc) of the image data is counted in the image playback mode and stored in the first file, and the first file is stored in the memory card inserted into the memory card slot 32 after the termination of the image playback mode. The operator takes out the memory card from the memory card slot 32 and inserts the same into the memory card slot 70 of the DPF 6. The CPU 50 of the DPF 6 may read out the first file from the memory card inserted into the memory card slot 70 and generate the third file, calculate the total time (Ca) from the playback time (Cc), and determine the prioritization of the image data in order of magnitude of the total time (Ca), the display control unit 66 then causing the LCD display unit 64 to sequentially display images based on the image data, on the basis of the prioritization.

Moreover, wireless USB communication may be used, or another communicating means other than USB communication may be used. Such means make it possible to transmit and receive image data and the like between the digital camera 4 and the DPF 6.

What follows is a description of an image display system according to a fourth embodiment, with reference to the accompanying drawings. The image display system according to the fourth embodiment is configured such that the DPF 6 is replaced with a television 8 in the image display system 2 according to the first embodiment, and the determination of the prioritization is instead performed in the television 8. Instead of storing a time when an image has been displayed (hereinafter, a display time (Cx) is used as a phrase that comprehensively includes the playback time (Cc), the projection time (Cp), the display time (Cd), the time when the image has been displayed on the television 8, and the like) in a predetermined file, the time is stored in a header part of the image data as tag information, and the most recently counted display time (Cx) is stored having been added to the display time(s) (Cx) already stored in the header part of the image data. A weighting is assigned to the display time (Cx) when the total time (Ca) is calculated in the ranking mode, whereby the prioritization is determined so as to reflect the importance of each of the display times (Cx). Consequently, a detailed description of constituent elements identical to those of the first embodiment has been omitted, and only points of difference are described in detail. Further, the description is provided using the same reference numerals for the same parts of the configuration as in the first embodiment.

Figure 14:
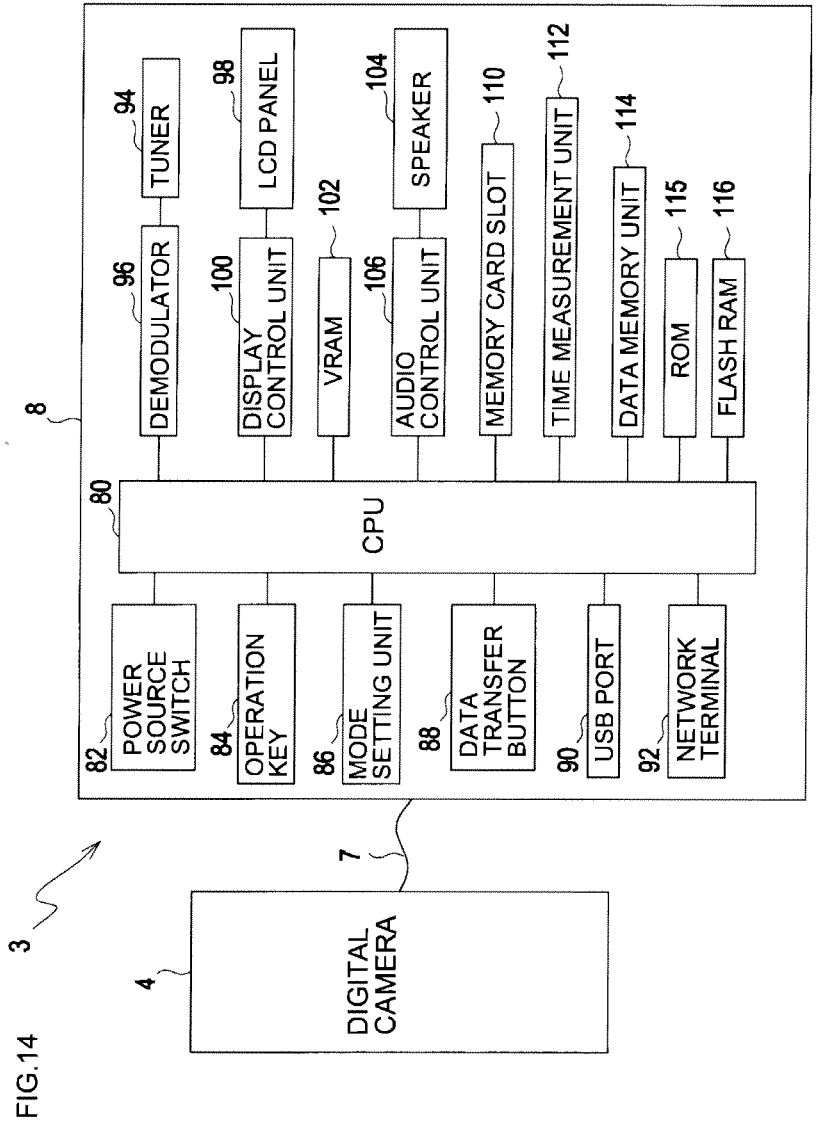
FIG. 14 is a block diagram illustrating a system configuration of a television in an image display system according to a fourth embodiment.

FIG. 14 is a block diagram illustrating the system configuration of the television 8 in an image display system 3 according to the fourth embodiment. The image display system 3 is provided with the digital camera 4 and with the television 8, and is connected via the USB cable 7. The television 8 is provided with a CPU 80, and the CPU 80 is provided with: a power source switch 82 for switching between an on and off state of a power source of the television 8; an operation key 84 used during a function setting of the television 8 and during a display setting of an image; a mode setting unit 86 for setting an image display mode for displaying an image and a ranking mode for determining a prioritization of image data and for displaying, on the basis of the prioritization, an image; a data transfer button 88 for commanding a transfer of data from the television 8 to the digital camera 4; a USB port 90 at which a USB machine is connected; and a network terminal 92 at which an Ethernet (trademark) standard or other network cable is connected.

The CPU 80 is connected to: a demodulator 96 for demodulating a broadcast signal received by a tuner 94 via an antenna (not shown); a display control unit 100 for controlling the display of an LCD panel 98; a VRAM 102 for storing image data relating to an image displayed on the LCD panel 98; an audio output control unit 106 for controlling audio outputted from a speaker 104; a memory card slot 110 for inserting and removing a memory card for storing the image data; a time measurement unit 112 for counting the display time (Cx) of an image having been displayed on the LCD panel 98; a data memory unit 114 for storing, for each file of the image data, the display time (Cx) counted in the time measurement unit 112; and a ROM 115 for storing a predetermined coefficient for assigning a weighting to the display time (Cx) when the total time (Ca) is calculated in the ranking mode. The CPU 80 is also connected to a flash RAM 116 and stores a program for controlling the entire television according to the embodiment as well as a program for executing the processing illustrated by the flow charts described below.

Figure 15:
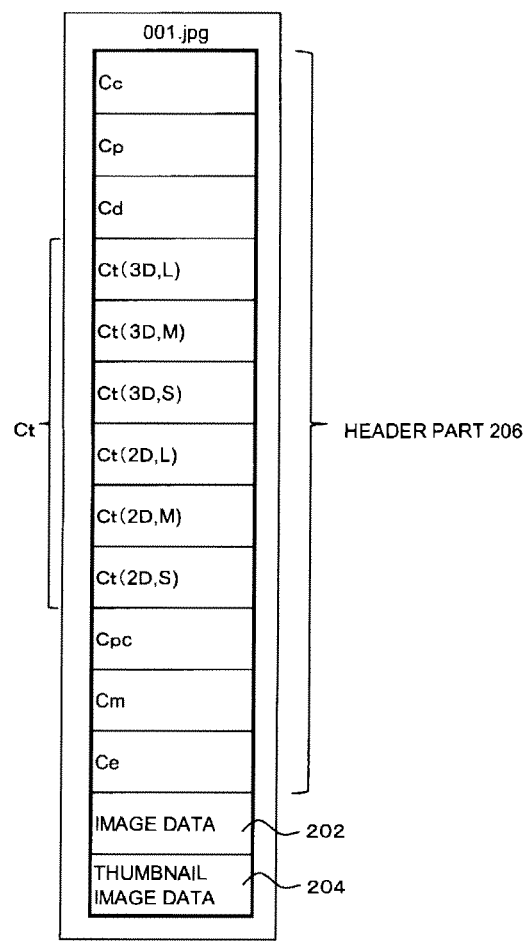
FIG. 15 is a drawing illustrating a configuration of an image file used in the image display system according to the fourth embodiment.

Next, a description of a configuration of an image file used in the image display system 3 according to the fourth embodiment shall now be provided, with reference to the accompanying drawings. Image data is stored in the memory card as an Exif or in another predetermined file format; for example, as illustrated in FIG. 15, thumbnail image data 204 and a header part 206 are appended to image data 202 relating to a file "001.jpg", which is an image file for 2D display. The header part 206 stores, as tag information, the display times (Cx), i.e.: the playback time (Cc) when the image based on the image data 202 has been played back on the LCD display unit 24 of the digital camera 4; the projection time (Cp) when the image has been projected by the projection unit 34 of the digital camera 4; the display time (Cd) when the image has been displayed on the LCD display unit 64 of the DPF 6; a display time (Ct) when the image has been displayed on the LCD panel 98 of the television 8; a display time (Cpc) when the image has been displayed on a display unit of a personal computer, which is an external machine (not shown); a display time (Cm) when the image has been displayed on a display unit of a mobile telephone, which is an external machine (not shown); and an editing history (Ce) of the image data.

Herein, the display time (Ct) is stored having been further classified into the display format and the display size of the image. Specifically, in a case where the image based on the image data 202 has been 3D-displayed on the LCD panel 98, then a display time (Ct (3D, L)) is stored in a case where the screen size of the television 8 is at least 60 inches. In a case where the screen size of the television 8 is 26 inches or greater and less than 60 inches, then a display time (Ct (3D, M)) is stored, and in a case where the screen size of the television 8 is less than 26 inches, than a display time (Ct (3D, S)) is stored. Similarly, in a case where the image based on the image data 202 is 2D-displayed on the LCD panel 98, then in a case where the screen size of the television 8 is at least 60 inches, a display time (Ct (2D, L)) is stored; in a case where the screen size of the television 8 is 26 inches or greater and less than 60 inches, a display time (Ct (2D, M)) is stored; and in a case where the screen size of the television 8 is less than 26 inches, a display time (Ct, (2D, S)) is stored.

The editing history (Ce) is information indicative of whether or not skin correction processing, cropping, or other forms of editing have been performed on the image data. For example, in a case where no editing has been performed on the image data, a value of 1.0 is stored, and in a case where cropping has been performed on the image data, a value of 1.5, which is a larger value than the 1.0 of the case where no editing has been performed, is stored. The editing history (Ce) is used as a coefficient for when the total time (Ca) is calculated in the ranking mode.

Figure 16:
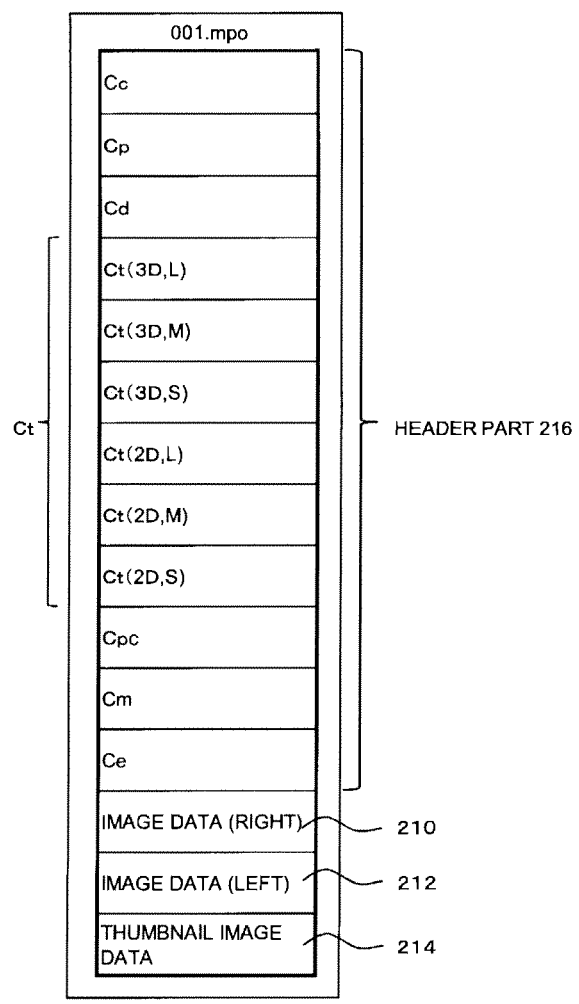
FIG. 16 is a drawing illustrating the configuration of the image file used in the image display system according to the fourth embodiment.

Right-eye image data and left-eye image data are stored in an image file of an image for 3D display. For example, as illustrated in FIG. 16, image data (right) 210 and image data (left) 212 are stored in an image file "001.mpo" of an image for 3D display, and thumbnail image data 214 and a header part 216 are appended to the image data (right) 210 and the image data (left) 212. The configuration of the header part 216 is similar to the case of the file "001.jpg" described using FIG. 15. In a case where an image using the image file "001.mpo" is 3D-displayed on the LCD panel 98 of the television 8, an image based on the image data (right) 210 and an image based on the image data (left) 212 are displayed alternatingly in time division. In a case of 2D display on the LCD panel 98, either an image based on the image data (right) 210 or an image based on the image data (left) 212 is displayed.

Figure 17:
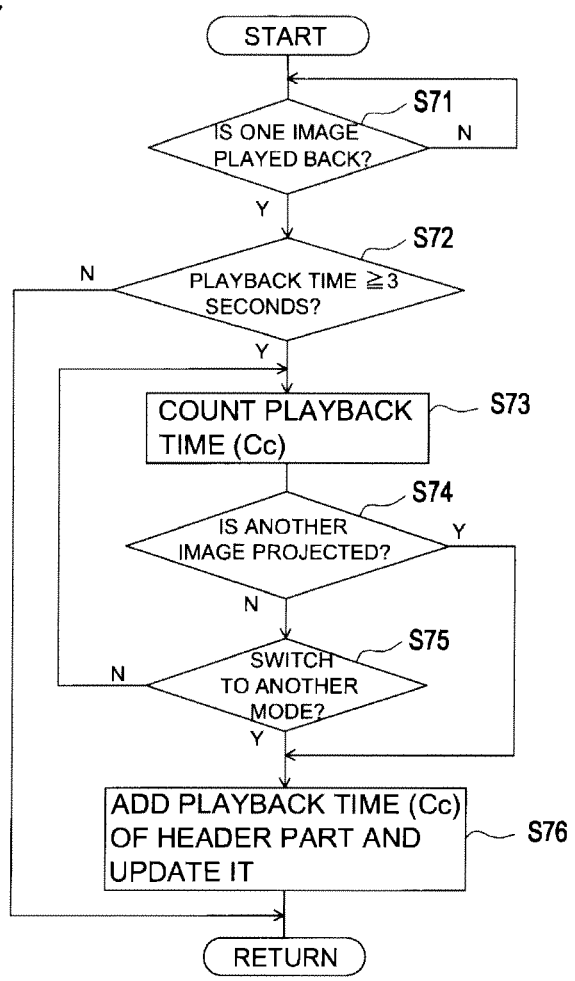
FIG. 17 is a flow chart illustrating image display processing of a digital camera in the image display system according to the fourth embodiment.

Next, a description of the image playback processing of the digital camera 4 in the image display system 3 according to the fourth embodiment shall now be provided, with reference to the flow chart illustrated in FIG. 17. Firstly, when the mode setting unit 16 is operated and the image playback mode is thereby set, the CPU 10 reads out image data selected by the operator from the memory card inserted into the memory card slot 32, and displays and plays back, on the LCD display unit 24, an image based on the image data, via the display control unit 26 (step S71). In a case where the image has been played back and displayed, a determination is made as to whether or not the time when the image has been played back and displayed has passed a predetermined duration of time (for example, 3 seconds) (step S72); in a case where the time when the image has been played back and displayed has passed the predetermined duration of time (step S72: Y), then a counting of the playback time (Cc) of the image is begun in the time measurement unit 36 (step S73). On the other hand, no counting is performed in a case where the time when the image has been played back and displayed has not passed the predetermined duration of time (step S72: N).

Next, the CPU 10 determines whether or not another image has been played back and displayed on the LCD display unit 24 (step S74). In a case where no other image has been played back and displayed (step S74: N), the CPU 10 determines whether or not a switch has been made from the image playback mode to another mode (step S75). In a case where another image has been played back and displayed (step S74: Y) and in a case where a switch has been made to another mode (step S75: Y), the CPU 10 adds the most recently counted playback time (Cc) to the playback time (Cc) already stored in the header part of the image data (step S76). For example, in the image file "001.jpg" (see FIG. 15), the header part 206 of the image data 202 is taken to already have stored a playback time (Cc) for 10 seconds. Herein, in a case where the image based on the image data 202 has been played back for 5 seconds on the LCD display unit 24, the CPU 10 adds these 5 counted seconds to the 10 seconds already stored in the header part 206, and updates the playback time (Cc) to 15 seconds. On the other hand, in a case where no switch has been made to another mode (step S75: N), the counting of the playback time (Cc) of the image is continued (step S73). After the termination of the image playback mode, the CPU 10 stores, in the memory card inserted into the memory card slot 32, the image file of the image data to which the playback time (Cc) has been added.

Next, when the data transfer button 18 is operated by the operator, the CPU 10 of the digital camera 4 reads out the image file stored in the memory card inserted into the memory card slot 32, and transmits the same from the USB port 20 to the television 8 via the USB cable 7. The television 8 receives the image file via the USB port 90, and a command from the CPU 80 causes the image file to be stored in the memory card inserted into the memory card slot 110.

Figure 18:
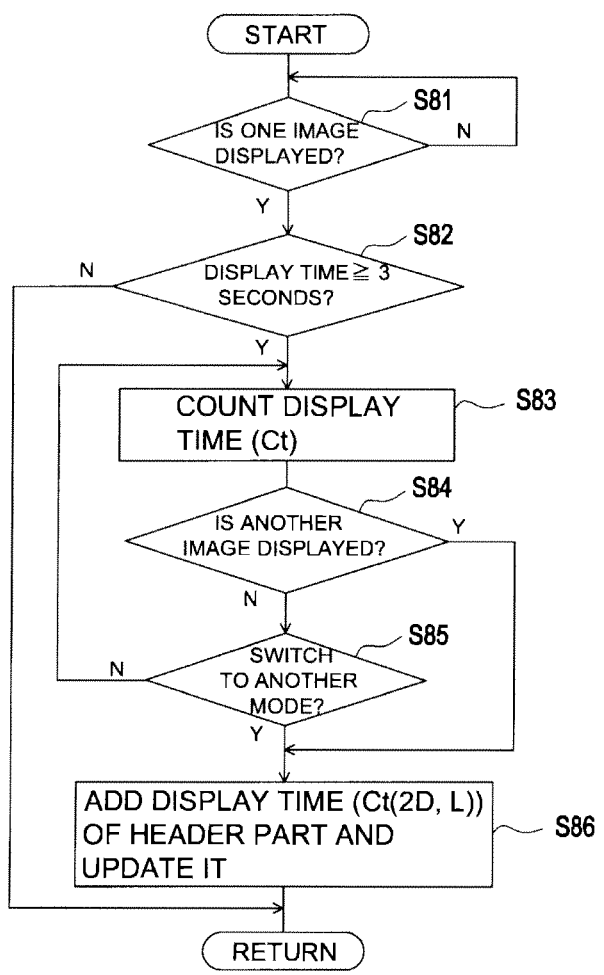
FIG. 18 is a flow chart illustrating image display processing of the television in the image display system according to the fourth embodiment.

Next, with reference to the flow chart illustrated in FIG. 18, a description of the image display processing of the television 8 in the image display system 3 according to the fourth embodiment shall now be provided, using the example of a case where the television 8 is a television having a 60-inch screen size for 2D display of images on the LCD panel 98. Firstly, when the mode setting unit 86 is operated and the image display mode is thereby set, the CPU 80 reads out image data selected by the operator from the memory card inserted into the memory card slot 110, and displays an image based on the image data on the LCD panel 98, via the display control unit 100 (step S81). In a case where the image has been displayed, the CPU 80 determines whether or not the time when the image has been displayed has passed a predetermined duration of time (for example, 3 seconds) (step S82); in a case where the time when the image has been displayed has passed the predetermined duration of time (step S82: Y), the CPU 80 begins a counting of the display time (Ct (2D, L)) of the image in the time measurement unit 112 (step S83). On the other hand, no counting is performed in a case where the time when the image has been displayed has not passed the predetermined duration of time (step S82: N).

Next, the CPU 80 determines whether or not another image has been displayed on the LCD panel 98 (step S84). In a case where no other image has been displayed (step S84: N), the CPU 80 determines whether or not a switch has been made from the image display mode to another mode (step S85). In a case where another image has been displayed (step S84: Y) and in a case where a switch has been made to another mode (step S85: Y), the CPU 80 adds the most recently counted display time (Ct (2D, L)) to the display time (Ct (2D, L)) already stored in the header part of the image data (step S86). For example, in the image file "001.jpg" (see FIG. 15), the header part 206 of the image data 202 is taken to already have stored a playback time (Ct (2D, L)) for 10 seconds. Herein, in a case where the image based on the image data 202 has been displayed for 5 seconds on the LCD panel 98, the CPU 80 adds these 5 counted seconds to the 10 seconds already stored in the header part 206, and updates the display time (Ct (2D, L)) to 15 seconds. On the other hand, in a case where no switch has been made to another mode (step S85: N), the counting of the display time (Ct (2D, L)) of the image is continued (step S83). After the termination of the image playback mode, the CPU 80 causes the image file of the image data to which the display time (Ct (2D, L)) has been added to be stored in the memory card inserted into the memory card slot 110.

Figure 19:
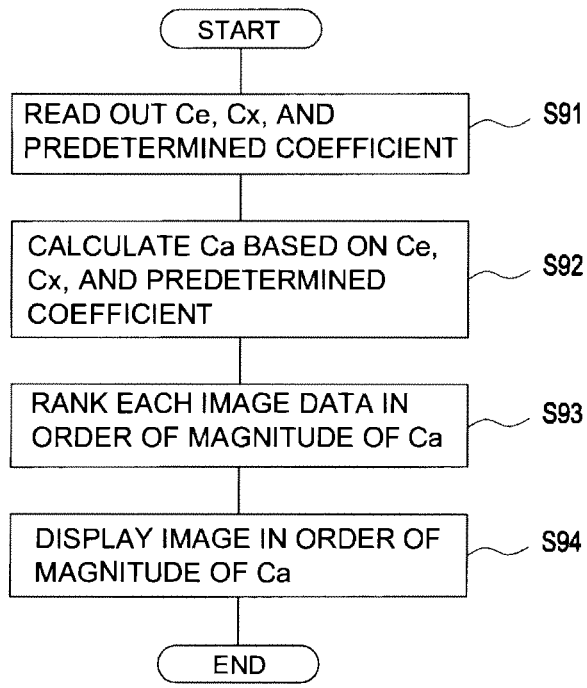
FIG. 19 is a flow chart illustrating prioritization determination processing of the image display system according to the fourth embodiment.

Next, a description of the prioritization determination processing in the image display system 3 according to the fourth embodiment shall now be provided, with reference to the accompanying drawings. FIG. 19 is a flow chart illustrating the prioritization determination processing of the television 8. Firstly, when the mode setting unit 86 is operated and the ranking mode is thereby set, the CPU 80 reads out the editing history (Ce) and the display times (Cx) from the header part having been appended to the image data of the image file stored in the memory card inserted into the memory card slot 110, and reads out a predetermined coefficient from the ROM 115 (step S91). Next, for each image file stored in the memory card, the total time (Ca) is calculated on the basis of a mathematical equation 1 (step S92).

$$\text{Total time }(Ca) = \text{editing history }(Ce) \times \{\alpha \times \text{playback time }(Cc) + \beta \times \text{projection time }(Cp) + \gamma \times \text{display time }(Cd) + \delta_1 \times \text{display time }(Ct(3D,L)) + \delta_2 \times \text{display time }(Ct(3D,M)) + \delta_3 \times \text{display time }(Ct(3D,S)) + \delta_4 \times \text{display time }(Ct(2D,L)) + \delta_5 \times \text{display time }(Ct(2D,M)) + \delta_6 \times \text{display time }(Ct(2D,S)) + \epsilon \times \text{display time }(Cpc) + \zeta \times \text{display time }(Cm)\} \quad \{\text{Math. 1}\}$$

Herein, in the mathematical equation 1, the display time (Cx) of an image displayed on a large screen and viewed by a multitude of people is multiplied by a coefficient having a high value, and the display time (Cx) of an image for confirmation displayed on a small screen is multiplied by a coefficient having a small value. Also, with respect to the LCD panel 98 of the television 8, the coefficient by which the display time (Cx) of an image which is displayed in 3D thereon is multiplied is a larger value than that of the coefficient by which the display time (Cx) of an image which is displayed in 2D thereon is multiplied. Consequently, the values of the predetermined coefficients are set such that $\zeta = \alpha = \epsilon < \gamma < \delta_6 < \delta_5 < \delta_4 < \delta_3 < \delta_2 < \delta_1 < \beta$, in this order.

The total time (Ca) is calculated such that, in a case where the value of the editing history (Ce) stored in the header part of the image data of the image file "001.jpg" is 1.0 and where the value of the display time (Cx) and the value of the predetermined coefficient corresponding to the value of the display time (Cx) are the numbers as illustrated in FIG. 20, then, on the basis of the mathematical equation 1, total time (Ca)=1.0× {1.0×15 seconds+4.0×8 seconds+1.5×0 seconds+2.8×0 seconds+2.6×0 seconds+2.4×0 seconds+2.2×15 seconds+2.0×0 seconds+1.8×0 seconds+1.0×4 seconds+1.0×3 seconds}=87 seconds.

Next, the CPU 80 determines the prioritization of the image data in order of magnitude of total time (Ca), and causes the order to be stored (step S93). For example, in addition to the image file "001.jpg", an image file "002.jpg" and an image file "003.jpg" are also stored in the memory card, and the total times (Ca) for each of the image files are taken to have been calculated. The total time (Ca) of the image based on the image data of the image file "001.jpg" is taken to be 87 seconds; the total time (Ca) of the image based on the image data of the image file "002.jpg" is taken to be 95 seconds; and the total time (Ca) of the image based on the image data of the image file "003.jpg" is taken to be 52 seconds. In such a case, the prioritization of the image data will be the image data of the image file "001.jpg", the image data of the image file "003.jpg", and the image data of the image file "002.jpg", in this order. Next, a command from the CPU 80 causes the image data to be read out sequentially from the memory card inserted into the memory card slot 110 on the basis of the prioritization order, and the display control unit 100 sequentially displays the images based on the read-out image data on the LCD panel 98 (step S104). The display images are switched over, for example, at 10-second intervals, and the images are displayed in order beginning with the earliest number of prioritization.

According to the image display system 3 based on the fourth embodiment, the time when the image has been played back is counted in the digital camera 4, and the prioritization of the image data can be determined in the television 8 on the basis of the time counted in the digital camera 4. Also, multiplying the display time (Cx) by the predetermined coefficient makes it possible to determine the prioritization so as to reflect the importance of each of the display times (Cx). Multiplying the display time (Cx) by the value of the editing history (Ce) makes it possible to give greater priority to image data that has been edited. Also, because the most recently counted display time (Cx) is added in the digital camera 4 and the television 8 to the display time (Cx) already stored in the header part of the image data, the prioritization can be determined in consideration also of the total time when the image has been displayed in the past.

What follows is a description of a television 8 according to a fifth embodiment, with reference to the accompanying drawings, using the example of a case where the television 8 is a television having a 60-inch screen size for the 3D display of images on the LCD panel 98. The television 8 according to the fifth embodiment is configured such that the processing performed in series in the image display system 2 according to the fourth embodiment is instead performed in the television 8. Also, the calculation of the total time (Ca) in the ranking mode has been made to reflect only the display time (Cx) of the image displayed on the own device. In a case where an image based on image data for 3D display has been displayed on the LCD panel 98, then the display time (Ct (3D, L)) is stored also in the header part of the image data for 2D display subordinate to the image data for 3D display (for example, image data for 2D display, in the case where there exists the image data for 3D display as well as the image data for 2D display for the same image). Consequently, a detailed description of constituent elements identical to those of the fourth embodiment has been omitted, and only points of difference are described in detail. Further, the description is provided using the same reference numerals for the same parts of the configuration as in the fourth embodiment.

Next, a description of the image display processing of the television 8 according to the fifth embodiment shall now be provided. Firstly, the CPU 80 counts the display time (Ct, (3D, L)) when the image based on the image data for 3D display has been 3D-displayed on the LCD panel 98, and stores the display time (Ct (3D, L)) in the header part of the image data for 3D display. For example, an image based on the image data (right) 210 and an image based on the image data (left) 212 of the image file "001.mpo" (see FIG. 16) are 3D-displayed on the LCD panel 98 for a total of 18 seconds. In such a case, the CPU 80 stores the display time (Ct (3D, L)) for 18 seconds in the header parts of the image data (right) 210 and the image data (left) 212.

Herein, in a case where the memory card has stored image data for 2D display that is subordinate to the image data of the image having been 3D-displayed on the LCD panel 98, then the CPU 80 stores the same display time (Ct (3D, L)) also for the header part of the subordinate image data for 2D display. For example, in a case where the image file "001.jpg" of the image for 2D display (see FIG. 15) is stored in the memory card and where the image data 202 of the image file "001.jpg" is subordinate to the image data (right) 210 and the image data (left) 212 of the image file "001.mpo" (see FIG. 16), then the CPU 80 causes the display time (Ct (3D, L)) to be stored for 18 seconds also in the header part 206 of the image data 202 for 2D display.

Figure 21:
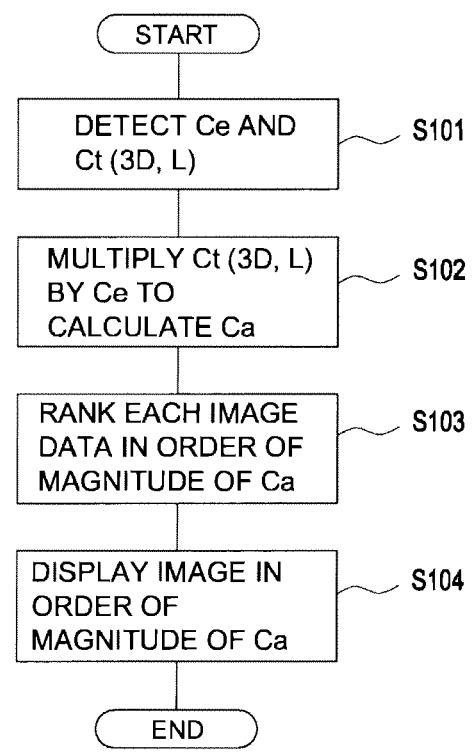
FIG. 21 is a flow chart illustrating prioritization determination processing of a television according to a fifth embodiment.

Next, a description of the prioritization determination processing by the television 8 according to the fifth embodiment shall now be provided, with reference to the accompanying drawings. FIG. 21 is a flow chart illustrating the prioritization determination processing of the television 8. Firstly, when the mode setting unit 86 is operated and the ranking mode is thereby set, then the CPU 80 detects, from among the image files stored in the memory card inserted into the memory card slot 110, an image file in which the display time (Ct (3D, L)) has been stored in the header part of the image data (step S101).

For example, the image file "001.mpo", the image file "002.mpo", the image file "003.mpo", the image file "004.mpo", and the image file "005.mpo" of the image data for 3D display are taken to have been stored in the memory card. In such a case, in a case where the display time (Ct (3D, L)) has been stored in the header part of the image data of the image file "001.mpo" and the image files "002.mpo" and "003.mpo" and the display time (Ct (3D, L)) has not been stored in the header part of the image data of the image file "004.mpo" and the image file "005.mpo", then the CPU 80 detects the image file "001.mpo", the image file "002.mpo", and the image file "003.mpo", and does not detect the image files "004.mpo" and "005.mpo".

Next, the CPU 80 reads out the editing history (Ce) and the display time (Ct (3D, L)) stored in the header parts of the image data of the detected image files, and calculates the total time (Ca) for each unit of image data on the basis of the editing history (Ce) and the display time (Ct (3D, L)) (step S102).

For example, a value of 1.0 for the editing history (Ce) and 18 seconds for the display time (Ct (3D, L)) are stored in the header part of the image data of the image file "001.mpo"; a value of 1.0 for the editing history (Ce) and 10 seconds for the display time (Ct (3D, L)) are stored in the header part of the image data of the image file "002.mpo"; and a value of 1.5 for the editing history (Ce) and 8 seconds for the display time (Ct (3D, L)) are stored in the header part of the image data of the image file "003.mpo".

In such a case, the total time (Ca) is calculated for the image data of the image file "001.mpo" such that 1.0×18 seconds=18 seconds. Similarly, for the image data of the image file "002.mpo", the total time (Ca) is calculated such that 1.0×10 seconds=10 seconds, and for the image data of the image file "003.mpo", the total time (Ca) is calculated such that 1.5×8 seconds=12 seconds.

Next, the CPU 80 determines the prioritization of the image data in order of magnitude of the calculated total time (Ce) (step S103). For example, the prioritization of the image data will be the image data of the image file "001.mpo", the image data of the image file "003.mpo", and the image data of the image file "002.mpo" in this order. Next, a command from the CPU 80 causes the image data to be sequentially read out from the memory card inserted into the memory card slot 110 on the basis of the prioritization, and the display control unit 100 sequentially displays the images based on the read-out image data on the LCD panel 98 (step S104). The display images are switched over, for example, at 10-second intervals, and the images are displayed in order beginning with the earliest number of prioritization.

According to the television 8 based on the fifth embodiment, it is possible to determine the prioritization of the image data on the basis of the display time (Ct) of the image having been displayed on the own device. Also, in a case where the image based on the image data for 3D display has been displayed on the LCD panel 98, because the display time (Ct (3D, L)) is stored also in the header part of the image data for 2D display subordinate to the image data for 3D display, it is possible to store the display time (Cx) unified in the header parts of mutually associated image data.

The embodiments above describe the example of a case where the mode setting unit 86 is operated and the ranking mode is thereby set, but the ranking mode may also be set in a case where new image data has been received via the USB port or in a case where the memory card has been inserted into the memory card slot 110.

The fourth embodiment describes the example of a case where the counting of the playback time (Cc) involves the addition of the most recently counted playback time (Cc), but the playback time (Cc) having already been stored may also be written over with the most recently counted playback time (Cc). The average value of the playback time (Cc) having already been stored and the most recently counted playback time (Cc) may also be stored. In a case where, for example, the playback time (Cc) having already been stored is 8 seconds and the most recently counted playback time (Cc) is 10 seconds, then 9 seconds, which is the average value, may also be stored.

Also, the fifth embodiment describes a case where the same display time is stored also in the header part of the subordinate image data for 2D display in a case where the image based on the image data for 3D display has been displayed on the LCD panel 98, but different display times may also be stored. For example, in a case where the image based on the image data for 3D display has been 3D-displayed for 18 seconds, then 9 seconds, which is 0.5 times the value thereof, may be stored as the display time (Ct (3D, L)) in the header part of the subordinate image data for 2D display. Also, in a case where the display time (Ct (3D, L)) of the image based on the image data for 3D display and the display time (Ct (2D, L)) of the image based on the subordinate image data for 2D display are different, then it is also possible for only the display time (Ct (3D, L)) of the image data for 3D display to be stored in the header parts of both sets of image data. In a case where, for example, the image based on the image data for 3D display has been displayed for 5 seconds and the image based on the subordinate image data for 2D display has been displayed for 15 seconds, then 5 seconds may be stored as the display time (Ct (3D, L)) in the header parts of both sets of image data. Also, in a case where the image based on the image data for 3D display and the image based on the subordinate image data for 2D display have each been displayed on the LCD panel of the television for 2D display, then it is possible to store only the display time of the image data for 2D display in the header part of either image data.

The embodiments above describe the example of a case where the all the images based on the image data for which the total time (Ca) has been calculated in the ranking mode are displayed, but it is also possible to display only images based on specific image data. For example, it is possible to display, in order of magnitude of the total time (Ca), only the images based on image data captured on January 1st from among all the image data for which the total time (Ca) has been calculated. Also, the total time (Ce) may also be calculated for each shooting date, and the images based on the image data having a first-place ranking in each of the shooting dates may be displayed as slides. Also, the total time (Ca) may be calculated for each specific time (for example, a week or a month) and the images based on the image data having a first-place ranking in each of the specific times may be displayed as slides. The images based on the image data having a top-3 ranking on each of the shooting dates may also be displayed as slides.

Also, in the fourth embodiment, the values of the predetermined coefficients may be allowed to be changed. For example, a printing unit that prints an image based on image data may be provided to the television 8, and in a case where an image has been printed three or more times by the printing unit, the value of the predetermined coefficient may be doubled when the total time (Ce) is calculated.

In the embodiments above, a reference value may be provided for the total time (Ca), where the image data for which the total time (Ca) is less than the reference value is not given a determined prioritization and is excluded from being subject to being displayed. Image data where the total time (Ca) is less than the reference value may also be deleted from the memory card.

In the embodiments above, in the case where the image has been edited, the editing history (Ce) is stored in the header part of the image data, but the state of the image at the time of editing may also be stored. For example, in a case where the face of a person image has been displayed with zoom in the image display mode, then the CPU stores information relating to the zoomed region in the header part of the image data. In a case where the image is displayed in the ranking mode, the CPU may display the face of the person image on the basis of the information relating to the zoomed region.

In the embodiments above, a higher prioritization may be given to an image that has been deliberately viewed by the operator. For example, in a case where the total time (Ca) of an image having been selected using a CEC (Consumer Electronics Control) is calculated, a value where the total value calculated in the prioritization determination processing is further multiplied by a coefficient Ccec may also be stored as the total time (Ca).

The fifth embodiment describes the example of a case where the header part of the image data is written over with the most recently counted display time (Cx), but, similarly with respect to the example described using the fourth embodiment, the most recently counted display time (Cx) may also be added to the display time (Cx) having already been stored in the header part of the image data.

In the fourth and fifth embodiments, the editing history (Ce) and the display time (Cx) are stored in the header part of the image data as tag information, but, similarly with respect to the first embodiment through third embodiment, for example, the editing history (Ce) and the display time (Cx) may be stored in a sixth file illustrated in FIG. 22 to calculate the total time (Ca).

The fourth and fifth embodiments describe the example of a case where the prioritization determination processing is performed in the television 8, but, instead of the television 8, the prioritization determination processing may also be performed in a personal computer, a mobile telephone, or another display device. In such a case, the CPU may use, in the prioritization determination processing, the display time (Cpc) when the image has been displayed on the display unit of the personal computer (see FIG. 15) or the display time (Cm) when the image has been displayed on the display unit of the mobile telephone (see FIG. 15).

The fourth and fifth embodiments describe the example of a case where the images based on the image data are displayed on a display unit, but images may also be displayed on the basis of the thumbnail image data.

In the fourth embodiment, similarly with respect to the first embodiment, the digital camera 4 may also be where the images are projected using the projection unit 34, the projection time (Cp) is counted, and the stored projection time (Cp) is stored in the header part of the image data.

In the fourth embodiment, the digital camera 4 and the television 8 may be interchanged, and the digital camera 4 may be where the prioritization is determined.

In the fourth embodiment, communication between the digital camera 4 and the television 8 is performed via the USB cable 7, but data may also be acquired directly from the memory cards by the insertion and removal of the memory cards into/from the memory card slots 32 and 110. Moreover, wireless USB communication may be used, or another communicating means other than USB communication may be used. Such means make it possible to transmit and receive image data and the like between the digital camera 4 and the television 8.

REFERENCE SIGNS LIST

2 . . . image display system; 4 . . . digital camera; 6 . . . digital photo frame; 7 . . . USB cable; 50 . . . CPU; 52 . . . power source switch; 54 . . . operation key; 56 . . . mode setting unit; 58 . . . data transfer button; 60 . . . USB port; 64 . . . LCD display unit; 66 . . . display control unit; 68 . . . memory unit; 70 . . . memory card slot; 72 . . . time measurement unit; 74 . . . data memory unit

The invention claimed is:

1. An image control device, comprising:
   an acquisition unit that acquires, from an external device having a first display unit that generates first data based on an amount of time for which an image based on image data is displayed on the first display unit, the image data as well as the first data;
   a second display unit that displays the image based on the image data;
   a generation unit that generates second data based on an amount of time for which an image based on image data is displayed on the second display unit;
   a determination unit determines a priority of the image data using the first data and the second data, and
   a display control unit controls the second display unit to display the image based on the image data based on the priority determined by the determination unit.

2. An image control device, comprising:
   an acquisition unit that acquires, from an external device that generates first data based on an amount of time for which an image based on image data is used by the external device, the image data and the first data;
   a control unit that uses the image based on the image data;
   a generation unit that generates second data based on an amount of time for which an image based on image data is used by the control unit; and
   a determination unit determines a priority of the image data using the first data and the second data.

3. The image control device according to claim 2, wherein the control unit displays the image based on the image data.

4. The image control device according to claim 2, wherein the control unit projects the image based on the image data.

5. The image control device according to claim 2, wherein the control unit plays back the image based on the image data.

6. An image control device, comprising:
   an acquisition unit that acquires, from an external device that generates first data based on a use situation of an image based on image data used by the external device, the image data and the first data;
   a control unit that uses the image based on the image data;
   a generation unit that generates second data based on a use situation of an image based on image data used by the control unit; and
   a determination unit that determines a priority of the image data using the first data and second data.

7. The image control device according to claim 6, wherein the control unit displays an image based on the image data.

8. The image control device according to claim 6, wherein the control unit projects an image based on the image data.

9. The image control device according to claim 6, wherein the control unit plays back an image based on the image data.

10. The image control device according to claim 6, wherein the control unit controls a printer that prints an image based on the image data.

11. An image control method, comprising:
    a step of acquiring, from an external device that generates first data based on a use situation of an image based on image data used by the external device, the image data and the first data;
    a step of controlling use of the image based on the image data;
    a step of generating second data based on a use situation of an image based on image data used by a control unit; and
    a step of determining a priority of the image data using the first data and second data.

12. The image control method according to claim 11, wherein
    the step of controlling the use of the image data comprises displaying an image based on the image data.

13. The image control method according to claim 11, wherein
    the step of controlling the use of the image data comprises projecting an image based on the image data.

14. The image control method according to claim 11, wherein
    the step of controlling the use of the image data comprises playing back an image based on the image data.

15. The image control method according to claim 11, wherein
    the step of controlling the use of the image data comprises controlling a printer that prints an image based on the image data.

16. The image control device according to claim 6, wherein
    the external device uses an image based on the image data for a first amount of time,
    the control unit uses the image based on the image data for a second amount of time,
    the first data is determined by the first amount of time, and
    the second data is determined by the second amount of time.

17. The image control device according to claim 6, wherein
    the external device uses an image based on the image data for a first number of times,
    the control unit uses the image based on the image data for a second number of times,
    the first data is determined by the first number of times, and
    the second data is determined by the second number of times.

* * * * *